United States Patent

[11] 3,622,272

[72] Inventors James J. Shyne
 Caldwell;
 John V. Milewski, Saddle Brook, both of N.J.
[21] Appl. No. 717,530
[22] Filed Apr. 1, 1968
[45] Patented Nov. 23, 1971
[73] Assignee General Technologies Corporation
 Reston, Va.

[54] METHOD OF GROWING SILICON CARBIDE WHISKERS
 9 Claims, 2 Drawing Figs.

[52] U.S. Cl. .................................................. 23/208
[51] Int. Cl. ..........................................C01b 31/36,
 B01j 17/32, B01j 1/00
[50] Field of Search ........................................ 23/208 A

[56] References Cited
 UNITED STATES PATENTS
3,011,912 12/1961 Gareis et al. ................ 23/208 X
3,161,473 12/1964 Pultz ........................... 23/208 A
3,246,950 4/1966 Gruber ........................ 23/208 A
3,275,415 9/1966 Chang et al. ................ 23/208 A
3,306,705 2/1967 Leineweber et al. ......... 23/208 A
3,391,681 7/1968 Westdorp .................... 23/142
 FOREIGN PATENTS
608,032 11/1960 Canada ....................... 23/142
 OTHER REFERENCES
O' Connor et al. Silicon Carbide, Pergamon Press (1960), pp. 78 and 79. TK7872 S4C48.

Primary Examiner—M. Weissman
Attorney—Laurence R. Brown

ABSTRACT: A method of growing silicon carbide whiskers of high quality and in high yield involves reacting a gas mixture of about 80–95 percent by volume hydrogen, 0.4–4 percent by volume hydrocarbon gas, 0.3–15 percent by volume carbon monoxide and 3–10 percent by volume inert carrier gas in a vapor atmosphere of silicon monoxide at an elevated temperature. The product is principally long-length, hairlike silicon carbide whiskers of high quality, and in high yield.

PATENTED NOV 23 1971　　　　　　　　　　　3,622,272

INVENTORS
JOHN V. MILEWSKI,
JAMES J. SHYNE

METHOD OF GROWING SILICON CARBIDE WHISKERS

BACKGROUND OF THE INVENTION

Silicon carbide whiskers of high strength have been made in the past. However, generally such methods as have been employed have not been too successful from a commercial standpoint, particularly where a high yield of the high quality, long-length, hairlike, $\beta$-silicon carbide material in an economical process is desired.

SUMMARY OF INVENTION

A method is provided herein for making silicon carbide whiskers of high strength and high quality. In a preferred embodiment of the invention, the method comprises first providing a reactant stream comprising a mixture of about 80–95 percent by volume hydrogen, 0.4–4 percent by volume hydrocarbon gas, 0.3–15 percent by volume carbon monoxide, and 3–10 percent by volume of an inert carrier gas, and then contacting the mixture with silicon monoxide vapor at an elevated temperature.

APPARATUS AND SYSTEM a. General Procedure

Figure 1:
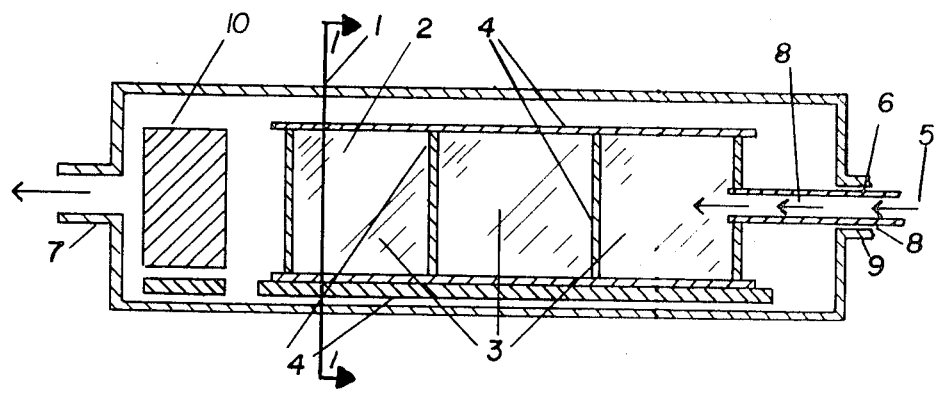
FIG. 1 shows a cutaway elevation of an apparatus including a growth module for growing silicon carbide whiskers according to the present invention.
Figure 2:
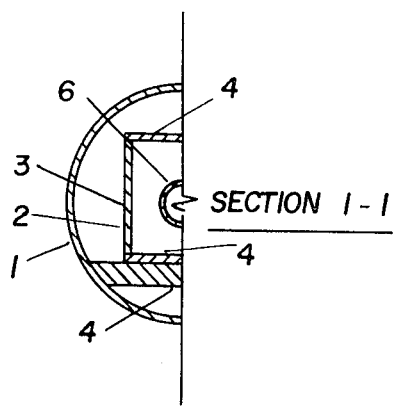
FIG. 2 is a half-sectional view taken along section 1—1 of FIG. 1.

FIGS. 1 and 2 illustrate the essential part of the apparatus and method employed for growing the silicon carbide whiskers. The whiskers are grown in a resistance-heated furnace (not shown) having appropriate heating elements, temperature-controllers, etc. Within the furnace is positioned a fused quartz muffle 1 having a growth module 2 therein which includes high-silica bricks 3 built on, supported and separated by slabs of graphite 4. The hydrogen and hydrocarbon reactant gases 5 are admitted into the upstream of muffle 1 through quartz inlet tube 6 which projects part way into the muffle. The exit gases are removed at a vent port 7 and burned off.

The carbon monoxide and inert carrier gases 8 are admitted together through the annular 9 between the inlet conduit and the muffle. An insulating brick shield 10 is positioned behind the muffle to reduce temperature gradients to a minimum in the furnace.

b. Growth Module

The growth module 2 is a channel-type structure open at both ends, whisker growth forms on the interior surfaces of the module. The silicon carbide whiskers grow both on the brick and the graphite slabs. The geometrical structure of the module confines whisker growth to the interior surfaces of the module.

The graphite plates 4 have exposed interior surfaces which are coated with metallic flake which serves as a nucleating agent for whisker growth, as will be described in detail hereinafter. The bricks are reused after a given run because higher yields are possible in later runs using previously used bricks, probably because the silica therein then is present in a reduced state.

c. Growth Cycle

The silicon carbide whiskers are grown using generally a 6-hour cycle.

In the process the furnace is first allowed to preheat at 2,530° F., then the furnace is purged with nitrogen until the flame on the burn-off gas is extinguished. The door of the furnace then is opened and the radiation shield is removed from the furnace. The module then is inserted into the furnace. The radiation shield is then inserted behind the module and the furnace door is closed. The nitrogen flow is turned off and the furnace is then purged with hydrogen at a flow rate of about 15 liters per minute for 15 minutes. The purged gas is turned off and the reactant gases are admitted into the furnace for whisker growth. A typical gas flow rate and concentration is as follows:

Typical Gas Flow Rates and Concentration

| Gas | Flow (cc./min.) | Concentration of Gas Mole Fraction (% by vol.) |
| --- | --- | --- |
| $H_2$* | 7,800 | 82.8 |
| CO | 710 | 7.6 |
| $CH_4$ | 105 | 1.1 |
| $N_2$ | 800 | 8.5 |
| Total Flow | 9,415 (cc./min.) | 100.0 |

*The cylinder hydrogen is passed through a Deox dryer and the resulting gas has a dew point of $<-80°$ F.

The furnace is allowed to remain at full power for about 30 minutes so that the furnace will reach growth temperature as rapidly as possible. The furnace temperature then is adjusted to climb from 2,530° to 2,630° F. during the course of the run, with a level temperature profile over the length of the muffle. Preferably the temperature gradient over the length of the muffle should exceed about 150° F.

The module is allowed to remain in the furnace for about 6 hours. At the end of this period the flow gases are turned off and a nitrogen purge started. The furnace is then opened, and the module containing the whisker growth is removed and a new module inserted.

d. Whisker Product

The module is cooled, disassembled and the mats of silicon carbide wool are separated from the brick and graphite substrates. The silicon carbide product is present principally in the form of long-length, hairlike whiskers.

Some of the parameters in the process which affect the yield, quality and physical characteristics of the silicon carbide whisker product produced thereby include the following: (a) composition of the reactant gas mixture, (b) method of silicon monoxide generation, (c) growth temperature, (d) nature of the substrate surface, (e) run time, and (f) growth character; effect of vapor concentration. Each of these will be discussed in detail below.

PARAMETERS IN PROCESS a. Reactant Gas Composition

The basic feed system in the process comprises a reducing gas, such as hydrogen, carbon monoxide, a hydrocarbon gas, such as methane, ethane, natural gas, etc. and an inert carrier gas, such as nitrogen, argon and the like. In the following more detailed description of the invention reference will be made to the four component system, $H_2$, CO, $CH_4$, $N_2$, although it will be understood that variations in accordance with the teachings of the invention any be made.

Preferably the gas constituents are present in the reaction chamber in the following concentration:

| Reactant Gas | Concentration (% by Vol.) | | |
| --- | --- | --- | --- |
| | Suitable | Preferred | Optimum |
| $H_2$ | 80–95 | 82–85 | 82.8 |
| CO | 0.3–15 | 5–10 | 7.6 |
| $CH_4$ | 0.4–4 | 0.7–2 | 1.1 |
| $N_2$ | 3–10 | 7–9 | 8.5 |

It has been found generally that concentrations of gas reactants outside of the suitable ranges provide small yields, present oxidizing conditions or result in an excess carbon deposit in the reactor. For these reasons it is desirable to operate within the ranges specified.

b. Silicon Monoxide Generation

The walls of the growth module are formed of slabs of insulating high-silica brick which serves both as a structural part of the module and as a source of SiO vapor. The silicon monoxide is generated when the feed gases react with the silica in the brick.

The reduction of the silica to silicon monoxide takes place under reducing conditions provided by the gaseous atmosphere and the presence of solids on the surface of the silica brick. For this reduction a reducing atmosphere of hydrogen is usually provided although actual reduction of the silica may take place by reaction with the hydrocarbon constituent of the feed gases, or carbon deposited on the brick by pyrolysis of the hydrocarbon. The silicon monoxide may be generated by reduction of the silica with such solids in which case a more neutral at atmosphere may be used, i.e., one containing a higher concentration of an inert carrier gas.

The kind of brick material used in the module influences the uniformity of release of SiO vapor.

Although any silica brick has been found to be generally suitable for SiO generation, it has been found that silica bricks solid by Babcock Wilcox and designated K30 appear to be preferred in relation to the yield and quality of the whisker product obtained. The silica content of the brick does not appear to be a critical variable in respect to yield of whiskers. However the degree of porosity of the brick is a more significant parameter because the reducing gases must permeate into the brick in order to contact the silicon dioxide, and, in turn, the SiO vapor must be vented into the reaction chamber. Usually about 3.3 kg. of K30 brick was used per module. The used brick is reused for several additional runs with a resultant increase in whiskers from used bricks.

c. Growth Temperature

The furnace temperature is programmed and controlled over the entire growth cycle. The gas reactants are introduced at 2,400° F. while the growing zone usually varies from about 2,550° to 2,750° F. although reactions may occur as high as 3,000° F. The waste gases leave the reactor at about 1,500° F. These temperatures provide the range of primary interest to whisker growth; however, the primary growth temperature range is believed to reside at about 2,550° to 2,750° F., and probably more particularly at 2,650° to 2,750° F.

d. Characteristics of the Substrate Surface

The yield and quality of the silicon carbide whiskers grown herein varied according to the nature of the growth substrate and, in particular, its surface treatment. In addition to total yield of whiskers the size (diameter) and concentration (whiskers per unit surface area) was influenced by the characteristics at the surface of the substrate. In some initial studies with bare graphite as the growth substrate, the whisker growth was observed to clustered in random areas on the graphite, and the runs produced a wide variety of sizes and types of whiskers. These whiskers ranged from white submicron wool to dark green, blue or even black large needles. It was also observed that the whiskers has small metallic ball-like growths on their tips and that the whisker diameter was related to the ball size. The balls on the tips of this whiskers are observed to be magnetic. As a consequence of this observation, iron powder was applied to the surface of the graphite surface and a greatly increased yield of whiskers was obtained. Subsequently it was discovered that powdered metal coatings of various types and compositions could be applied to the graphite surface to promote the formation of active growth sites for controlling the size and concentration of the SiC whiskers produced. The powdered metal also was suspended in a liquid vehicle and applied in a brushing-type application.

Generally surface nucleation with powdered metal coatings of iron, manganese, nickel, aluminum and stainless steel was more beneficial to the process than with such metals as titanium, magnesium silicon, copper or silver. For the formation of whiskers in the 1–10 micron range, for example, a graphite surface coated with stainless steel is a preferred, and iron and iron alloys are more likely to produce larger diameter whiskers.

A particularly useful nucleating agent is flakes of stainless steel such as sold by the Metal Disintegrating Corp. as "MD750" of "MD756." Iron powder sold by Glidden Co. as "A-130" of minus 325 mesh is a useful agent for making whiskers of medium diameter, i.e., 2–12 microns, while iron powder sold by Glidden Co. as "A-283" of minus 100 mesh is better for large diameter whiskers, about 6–30 microns. In general iron and iron alloys produce whiskers of larger diameter than the stainless steel powders. Preferably the nucleating metal particles should be small and of uniform size and mass.

As mentioned, the metal powders also may be applied from a liquid suspension in a carrier vehicle, such as isoproprophyl alcohol. For this type application it is customary also to include a resin binder such as acryloid resin sold by Rohm and Haas Co. as "A-10," "F-10" or "B82" resins. A suitable suspension comprises about 1 gram metal in 100 cc. of a vehicle made up of equal volume mixture of resin and carrier. More concentrated suspensions, of up to about 5 percent or more, also may be used.

e. Run Time

The yield of whisker product is a function not only of the several parameters described above but also of the total time of the run. The yield of prime SiC wool was observed to be about 0.5 grams per hour over a 6-hour run period and about 0.35 grams per hour over a 15-hour period using optimum growth conditions. A lesser yield of less than prime material also is produced.

f. Growth Characterization; Effect of Vapor Concentration

The silicon carbide whiskers made by the process of the invention are of the $\beta$-(beta) crystalline structure, and of high-quality single crystal material. The prime whiskers are long-haired and woollike in appearance. The average diameter of the whiskers are about 1–10 microns, the average length is about 0.2–1 inch, and the maximum length is about 1–4 inches. These whiskers exhibit a tensile strength of about 1–3 × $20^6$ p.s.i., and an elastic modulus of about $80 \times 10^6$ p.s.i.

Such whiskers are produced under optimum growth conditions particularly with respect to the concentration of reactants. It has been observed that a mixture of wool and ball cluster whiskers are produced at an excess concentration of vapor reactants while whiskers in the form of needles having a diameter of about 10–30 microns are grown at a relatively low vapor concentration.

a. Optimum Conditions

| | | |
|---|---|---|
| $H_2$ | 82.8% by vol. | (dew point −80° F.) |
| $CH_4$ | 1.1% by vol. | (93% methane) |
| CO | 7.6% by vol. | (dew point −60° F.) |
| $N_2$ | 8.5% by vol. | (dew point −60° F.) |
| Silica Brick | | Babcock-Wilcox K-30—Reused (51.4% $SiO_2$; 45.3% $AlO_3$) |
| Substrate | | Graphite—National Carbon AGSX |
| Coating | | Stainless Steel Flakes—MD750 Alcan Metal Powders Type 304 Stainless 3 g./100 ml. of one part F-10 Resin Rohm and Haas to one part isopropyl alcohol |
| Temp. | | 2,700° F. |
| Time of Run | | 6 hours |
| Whiskers | | 1–10 micron diameter, 1–4 inch length silicon carbide wool, |
| Yield | | 3 grams |

While the invention has been described with reference to the more suitable growth conditions, it will be understood that variations and changes may be made without departing from the principles and spirit of the invention. For example, a secondary stream of methane-hydrogen gas may be injected into the muffle past the deposition zone to remove any water produced in the growth reaction. Metals alloys may be used as nucleating powders for the substrate surface. Elemental silicon also may be added to the silica brick to produce a more reactive brick. While hydrogen gas is a preferred reducing gas atmosphere, inert gases, such as argon reducing conditions are sufficient to form silicon monoxide from silica. For example reducing carbon may be used for this purpose in which case a more neutral or inert atmosphere may be employed.

What is claimed is:

1. A method of growing silicon carbide whiskers which comprises contacting a silica brick and graphite growth module with a reactant gas comprising 80 to 95 percent by volume of hydrogen, 0.3 to 15 percent by volume of carbon monoxide, 0.4 to 4 percent by volume of a hydrocarbon gas and 3 to 10 percent by volume of an inert carrier gas at an elevated temperature of from 2,400° to about 3,000° F. for a period sufficient to form the desired whiskers, and removing a silicon carbide whisker product therefrom.

2. A method according to claim 1 in which the silica brick comprises porous silica.

3. A method according to claim 1 wherein said hydrocarbon is methane.

4. A method according to claim 1 wherein said inert carrier gas is nitrogen.

5. A method according to claim 1 wherein said growth occurs on a graphite substrate which is coated with an iron, manganese, nickel or aluminum powder.

6. A method according to claim 1 wherein the hydrogen concentration is 81-85 percent by volume, the hydrocarbon gas is 0.7-2.0 percent by volume, the carbon monoxide is 5-10 percent and the inert carrier gas is about 7-9 percent by volume.

7. A method according to claim 1 wherein the hydrogen concentration is about 82.8 percent by volume, the carbon monoxide is 7.6 percent by volume, the hydrocarbon is methane having a concentration of about 1.1 percent by volume, and the inert gas is nitrogen having a concentration of about 8.5 percent by volume, the temperature is about 2,650°-2,750° F., the substrate is graphite coated with stainless steel flake powder, and the hydrogen is dried to a dew point of −80° F.

8. A method according to claim 1 wherein said temperature is between 2,530°-2,750° F.

9. A method according to claim 1 wherein said hydrogen and hydrocarbon gases on one hand, and said carbon monoxide and inert carrier gases on the other hand, are admitted in separate streams into a channel through said growth module.

* * * * *